US011551061B2

(12) United States Patent
Mayer et al.

(10) Patent No.: US 11,551,061 B2
(45) Date of Patent: *Jan. 10, 2023

(54) SYSTEM FOR GENERATING SYNTHETIC DIGITAL DATA OF MULTIPLE SOURCES

(71) Applicant: Rohde & Schwarz GmbH & Co. KG, Munich (DE)

(72) Inventors: Timo Mayer, Munich (DE); Mikhail Volianskii, Mering (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 471 days.

This patent is subject to a terminal disclaimer.

(21) Appl. No.: 16/778,929

(22) Filed: Jan. 31, 2020

(65) Prior Publication Data

US 2021/0241075 A1 Aug. 5, 2021

(51) Int. Cl.
*G06N 3/04* (2006.01)
*G06N 3/08* (2006.01)
*G06F 11/30* (2006.01)

(52) U.S. Cl.
CPC ............. *G06N 3/0454* (2013.01); *G06N 3/08* (2013.01)

(58) Field of Classification Search
CPC ........ G06N 3/0454; G06N 3/08; G06N 3/088; G06F 11/3082; G06F 11/3089
See application file for complete search history.

(56) References Cited

U.S. PATENT DOCUMENTS 10,771,807 B1 * 9/2020 Ulaganathan ............ G06N 3/04
11,386,563 B2 * 7/2022 Figueroa-Alvarez ..... G06T 7/10
(Continued)

FOREIGN PATENT DOCUMENTS

CN 108053454 A 5/2018
KR 101843066 B1 5/2018
(Continued)

OTHER PUBLICATIONS

O'Shea et al., "An Introduction to Deep Learning for the Physical Layer", Published in arXiv:1702.00832v2 [cs.IT], Jul. y, 2017, 13 pages.

(Continued)

*Primary Examiner* — Bobbak Safaipour
(74) *Attorney, Agent, or Firm* — Ditthavong, Steiner & Mlotkowski

(57) ABSTRACT

The invention relates to a system for generating synthetic digital data, comprising: a receiver configured to receive at least one measured signal, in particular an RF signal or a sensor signal, a converter configured to convert the at least one measured signal to a digital dataset representing signal characteristics of the at least one measured signal, at least one trainable neural network encoder, wherein, during a training routine, the neural network encoder is configured to receive the digital dataset and to generate a compressed representation of the digital dataset, a processing unit configured to analyze the compressed representation and to detect a correlation between the digital dataset and the compressed representation, wherein the processing unit is configured to generate decoder input data based on the detected correlation, and a trained neural network decoder which is configured to receive the decoder input data and to generate synthetic digital data representing signal characteristics of the at least one measured signal based on the decoder input data.

13 Claims, 7 Drawing Sheets

(56) References Cited

U.S. PATENT DOCUMENTS

| | | | | |
|---|---|---|---|---|
| 2020/0311551 A1* | 10/2020 | Aytekin | ............... | G06N 3/0454 |
| 2020/0342306 A1* | 10/2020 | Giovannini | .......... | G06N 3/0454 |
| 2020/0364572 A1* | 11/2020 | Senn | .................... | G06N 3/0454 |
| 2021/0241074 A1* | 8/2021 | Mayer | .................. | G06N 3/0454 |
| 2022/0223035 A1* | 7/2022 | Yang | .................... | G06V 10/764 |

FOREIGN PATENT DOCUMENTS

| | | |
|---|---|---|
| KR | 101975186 B1 | 5/2019 |
| WO | 2019031794 A1 | 2/2019 |

OTHER PUBLICATIONS

Shi et al, "Generative Adversarial Network for Wireless Signal Spoofing", Published in WiseML 2019: Proceedings of the ACM Workshop on Wireless Security and Machine Learning, May 2019, 6 pages.

Davaslioglu et al., "Generative Adversarial Learning for Spectrum Sensing", Published in Published in: 2018 IEEE International Conference on Communications (ICC), May 2018, 6 pages.

Roy et al., "Detection of Rogue RF Transmitters using Generative Adversarial Nets", Published in: 2019 IEEE Wireless Communications and Networking Conference (WCNC), 7 pages.

\* cited by examiner

US 11,551,061 B2

SYSTEM FOR GENERATING SYNTHETIC DIGITAL DATA OF MULTIPLE SOURCES

TECHNICAL FIELD OF THE INVENTION

The invention relates to the generation of synthetic data by neural networks. More specifically, the invention relates to a system and a method for generating synthetic digital data using neural network encoders and decoders to a test method for a physical entity, to the use of synthetic data in a test method and to a computer program.

BACKGROUND OF THE INVENTION

New measurement and communication equipment is often tested before its implementation to evaluate the behavior and performance of the equipment. Such tests can be performed by feeding the equipment with data that is provided in the form of test sets or simulation sets. In this way, for example, the response of automotive sensors or communication devices to different environmental conditions can be tested before installing or implementing these devices.

The test and simulation sets are typically based on measurement data that was recorded by real world measurements or comprise such data. However, the measurement data that is provided by different measurement or communication equipment is often interdependent. For example, the measurement result of two sensors can depend on each other, even if both sensors are adapted to detect different parameters.

However, the amount of available measurement data for generating the test set is often limited and does not take all interdependencies into account. For instance, not all possible sensor combinations can be used when generating test data for individual sensors of an autonomous driving application.

It is known to generate artificial data based on a limited number of known data via machine learning techniques. Possible techniques for generating artificial data are principle component analysis, general adversarial networks (GAN), or variational autoenconders (VAE).

A general advisory network (GAN) usually comprise two neural networks that are trained simultaneously. One neural network tries to generate better artificial data while the other neural network tries to distinguish the generated data from the real data. This results in a competition between the two neural networks, which leads to the artificially generated data becoming more and more similar to real world data.

The document KR 101843066 B1, for instance, discloses the use of a modified GAN for generating and labeling data. A generator and a discriminator of the modified GAN are taught with real data and with information on a label to which the real data belongs. The modified GAN can generate similar artificial data and estimate a specific label for this data. The document WO 2019/031794 A1 also discloses teaching a generator and a discriminator of a modification GAN with information of a label and with actual data in order generate similar artificial data.

The document CN 108053454 A disclose a method for generating graph-structure data based on deep convolutional generative adversarial networks (DCGAN). The document KR 101975186 B1 discloses the use of a GAN with a generator for generating a fake image based on input data, and a discriminating for identifying whether an image is fake or real.

It is also known to use GAN networks in the context of wireless communication technology. Examples for such uses can be found in: Shi, Yi, Kemal Davaslioglu, and Yalin E. Sagduyu, "Generative adversarial network for wireless signal spoofing", Proceedings of the ACM Workshop on Wireless Security and Machine Learning, 2019; Davaslioglu, Kemal, and Yalin E. Sagduyu, "Generative adversarial learning for spectrum sensing", 2018 IEEE International Conference on Communications (ICC), 2018; and Roy, Debashri, et al., "Detection of Rogue RF Transmitters Using Generative Adversarial Nets", IEEE WCNC, 2019.

In contrast, variational autoencoders (VAE) learn to distribute input data and to generate new data from the input data. They usually comprise of an encoder neural network, which is trained to encode input data, and a decoder neural network, which is trained to decode the encoded input data. For VAEs training data is required to cover the underlying parameter space. For example, VAEs can be used to generate artificial images based on a training set of real images.

A further application of VAEs is shown in T. O'Shea and J. Hoydis, "An Introduction to Deep Learning for the Physical Layer," in IEEE Transactions on Cognitive Communications and Networking, vol. 3, no. 4, pp. 563-575, 2017. Here, the VAE is used to optimize transmitter and receiver components in a communication system.

Thus, it is an objective to provide an improved system and an improved method for generating synthetic data, as well as an improved test method for physical entities, which avoid the above-mentioned disadvantages. In particular, it is an objective to provide a concept for generating synthetic data resembling data attained by real world measurements with multiple interdependent sources.

SUMMARY OF THE INVENTION

The object of the present invention is achieved by the solution provided in the enclosed independent claims. Advantageous implementations of the present invention are further defined in the dependent claims.

According to a first aspect, the invention relates to a system for generating synthetic digital data, comprising a receiver configured to receive at least one measured signal, in particular an RF signal or a sensor signal, a converter configured to convert the at least one measured signal to a digital dataset representing signal characteristics of the at least one measured signal, at least one trainable neural network encoder, wherein during a training routine the neural network encoder is configured to receive the digital dataset and to generate a compressed representation of the digital dataset, a processing unit configured to analyze the compressed representation and to detect a correlation between the digital dataset and the compressed representation, wherein the processing unit is configured to generate decoder input data based on the detected correlation, a trained neural network decoder which is configured to receive the decoder input data and to generate synthetic digital data representing signal characteristics of the at least one measured signal based on the decoder input data. This achieves the advantage, that synthetic data resembling data attained by one or more real world measurements can be generated efficiently on the basis of a limited set of measured signals.

The receiver can receive multiple different measured signals, for instance multiple sensor signals from different sensors.

These sensors can be interdependent and the interdependency can be represented by the dataset and the compressed representation. Also the generated synthetic digital data can represent this interdependency.

In particular, the digital dataset fed to the neural network encoder for training is real world data generated on the basis of at least one real world measurement with at least one measurement device, e.g. a sensor.

The processing unit can be a computer or other data processing device. In particular, the neural network encoder and/or the at least one neural network decoder are executed by the processing unit.

The neural network encoder and the at least one neural network decoder can form at least one variational autoencoder (VAE).

The neural network encoder and the neural network decoder can comprise layers, wherein the neural network encoder comprises encoder layers and the neural network decoder comprises decoder layers. In particular, the neural network encoder and the neural network decoder can be configured as deep learning models.

In particular, the term trained neural network encoder respectively decoder refers to the neural network encoder respectively decoder after performing the training routine.

The compressed representation of the digital data can be a digital data pattern with a certain dimension, in particular with a lower dimension than the digital data generated by the converter based on the measured signal. The compressed representation can comprise a distribution over a latent space. Preferably, the compressed representation of the digital data comprises latent variable data and/or encoded data.

In particular, during the training routine, the neural network encoder is configured to convert the digital data to the compressed representation and the neural network decoder is configured to reconvert the compressed representation to the synthetic digital data.

In an embodiment, the processing unit is configured to generate the decoder input data by superimposing random or pseudorandom data with information based on the detected correlation, wherein the information on the detected correlation represents constraints on the random or pseudorandom data. This achieves the advantage that decoder input data for producing synthetic data that shows specific dependencies detected in real world measurements can be generated.

The random or pseudorandom data can comprises a digital data pattern with the same dimension as the compressed representation. In particular, the random or pseudorandom data resembles the compressed representation.

The constraints on the random or pseudorandom data can be applied by restricting the size, amount or dimensionality of the random or pseudorandom data.

The constraint can be applied to the random or pseudorandom data by replacing a part of the random or pseudorandom data with fixed non-random data. For instance, the random or pseudorandom data comprises a string of integers, in particular randomized integers, and the constraint is applied by replacing a section of these integers by specific other integers.

Furthermore, the constraint can be applied to the random or pseudorandom data by applying a mathematical function or operator to the random or pseudorandom data.

In an embodiment, the digital dataset comprises at least two data segments, wherein the system comprises a plurality of trainable neural network encoders, wherein during the training routine each neural network encoder is configured to receive a data segment of the digital dataset and to generate a compressed representation of the respective data segment. This achieves the advantage that the system can be trained with complex datasets comprising different data segments.

The different data segments can result from different measurement signals recorded by different measuring devices, e.g. sensors. For instance, the different data segments refer to different frequency areas of a measurement signal.

In particular, the different data segments are interdependent.

The processing unit of the system can be configured to executed the plurality of trainable network encoders.

In an embodiment, the processing unit is configured to analyze the compressed representations of each data segment and to detect a correlation between each data segment and the corresponding compressed representation, in particular by comparing the compressed representations with each other. This achieves the advantage that the correlation between each data segment and its source can be considered when generating the synthetic data.

In an embodiment, the processing unit is configured to generate the decoder input data based on the detected correlations for each data segment. This achieves the advantage that synthetic data that comprises signal characteristics of interdependent signals can be generated efficiently.

Preferably, during the training routine the at least one neural network encoder and/or the neural network decoder can be configured to compare the reconstructed digital data generated by the neural network decoder to the corresponding digital dataset fed to the neural network encoder. Furthermore, the processing unit can be configured to determine a loss function, representing an accuracy loss between the digital dataset and the corresponding reconstructed digital dataset. Subsequently, the neural network encoder and/or decoder can be configured to adapt the structure of its respective neural network to based on the loss function.

All embodiments of the system for generating synthetic digital data can be combined.

According to a second aspect, the invention relates to a method for generating synthetic digital data, comprising the steps of: training at least one neural network encoder, by: a) receiving at least one measured signal, in particular an RF signal or a sensor signal, b) converting the at least one measured signal to a digital dataset representing signal characteristics of the at least one measured signal, and c) feeding said digital dataset to the at least one neural network encoder, wherein the neural network encoder is configured to generate a compressed representation of the digital dataset; the method further comprising: analyzing the compressed representation to detect a correlation between the digital dataset and the compressed representation, generating decoder input data based on the detected correlation, feeding the decoder input data to a trained neural network decoder, wherein the trained neural network decoder is configured to generate synthetic digital data representing signal characteristics of the at least one measured signal based on the decoder input data. This achieves the advantage, that synthetic data resembling data attained by one or more real world measurements can be generated efficiently on the basis of a limited set of measured signals.

During the training, multiple different measured signals can be received, for instance multiple sensor signals from different sensors. These sensors can be interdependent and the interdependency can be represented in the dataset and the compressed representation. In addition, the synthetic digital data can represent this interdependency.

In particular, the digital dataset fed to the neural network encoder for training is real world data generated on the basis of at least one real world measurement with at least one measurement device, e.g. a sensor.

The neural network encoder and/or the at least one neural network decoder can be executed by a processing unit.

Preferably, the neural network encoder and the at least one neural network decoder can form a variational autoencoder (VAE).

The neural network encoder and the neural network decoder can comprise layers. In particular, the neural network encoder comprises encoder layers and the neural network decoder comprises decoder layers. In particular, the neural network encoder and the neural network decoder can be configured as deep learning models.

In particular, the term trained neural network encoder respectively decoder refers to the neural network encoder respectively decoder after performing the training routine.

The compressed representation of the digital data can be a digital data pattern with a certain dimension, in particular with a lower dimension than the digital data generated by the converter based on the measured signal. The compressed representation can comprise a distribution over a latent space. Preferably, the compressed representation of the digital data comprises latent variable data and/or encoded data.

In particular, during the training routine, the neural network encoder is configured to convert the digital data to the compressed representation and the neural network decoder is configured to reconvert the compressed representation to the synthetic digital data.

In an embodiment, the decoder input data is generated by superimposing random or pseudorandom data with information based on the detected correlation, wherein the information on the detected correlation represents constraints on the random or pseudorandom data. This achieves the advantage that decoder input data for producing synthetic data that shows specific dependencies detected in real world measurements can be generated.

The random or pseudorandom data can comprise a digital data pattern with the same dimension as the compressed representation. In particular, the random or pseudorandom data resembles the compressed representation.

The constraints on the random or pseudorandom data can be applied by restricting the size, amount or dimensionality of the random or pseudorandom data.

The constraint can be applied to the random or pseudorandom data by replacing a part of the random or pseudorandom data with fixed non-random data. For instance, the random or pseudorandom data comprises a string of integers, in particular randomized integers, and the constraint is applied by replacing a section of the randomized integers by specific integers.

Furthermore, the constraint can be applied to the random or pseudorandom data by applying a mathematical function or operator to the random or pseudorandom data.

In an embodiment, the digital dataset comprises at least two data segments, wherein a plurality of neural network encoders are trained, wherein during the training routine each neural network encoder is configured to receive a data segment of the digital dataset and to generate a compressed representation of the respective data segment. This achieves the advantage that the system can be trained with complex datasets comprising of different data segments, e.g. from different data sources.

The different data segments can be interdependent and/or can result from different measurement signals recorded by different measuring devices, e.g. sensors.

In an embodiment, the step of detecting a correlation between the digital dataset and the compressed representation comprises detecting a correlation between each data segment and the corresponding compressed representation, in particular by comparing the compressed representations with each other. This achieves the advantage that the correlation between each data segment and its source can be considered when generating synthetic data.

In an embodiment, the decoder input data is generated based on the detected correlations for the at least two data segments. This achieves the advantage that synthetic data that comprises signal characteristics of interdependent signals can be generated efficiently.

In an embodiment, the at least one neural network encoder and neural network decoder are further trained by feeding the compressed representation of the digital dataset to the neural network decoder, wherein the neural network decoder is configured to generate a reconstruction of the digital dataset based on the compressed representation, comparing the reconstructed digital dataset generated by the neural network decoder to the corresponding digital dataset fed to the neural network encoder, determining a loss function, representing an accuracy loss between the digital data and the corresponding reconstructed digital data, and adapting the neural network encoder and/or the neural network decoder based on the loss function.

All embodiments of the method for generating synthetic digital data can be combined.

According to a third aspect, the invention relates to a test method for a physical entity, in particular a communication channel or a measurement device, comprising feeding the entity with the synthetic data generated by the method according to the second aspect of the invention, and performing a real world measurement as to characteristics of the entity.

The physical entity can be a sensor, e.g. a radar or lidar device, a communication device, e.g. for 4G or 5G networks, or a signal generator. The physical entity can be an electronic instrument.

According to a fourth aspect, the invention relates to the use of synthetic digital data generated by the method according to the second aspect of the invention in a test method for a physical entity, in particular a test method according to the fourth aspect of the invention.

According to a fifth aspect, the invention relates to a computer program comprising a program code for performing the method according to the second aspect of the invention.

BRIEF DESCRIPTION OF THE DRAWINGS

The invention will be explained in the followings together with the figures.

DETAILED DESCRIPTION OF THE PREFERRED EMBODIMENTS

Figure 1:
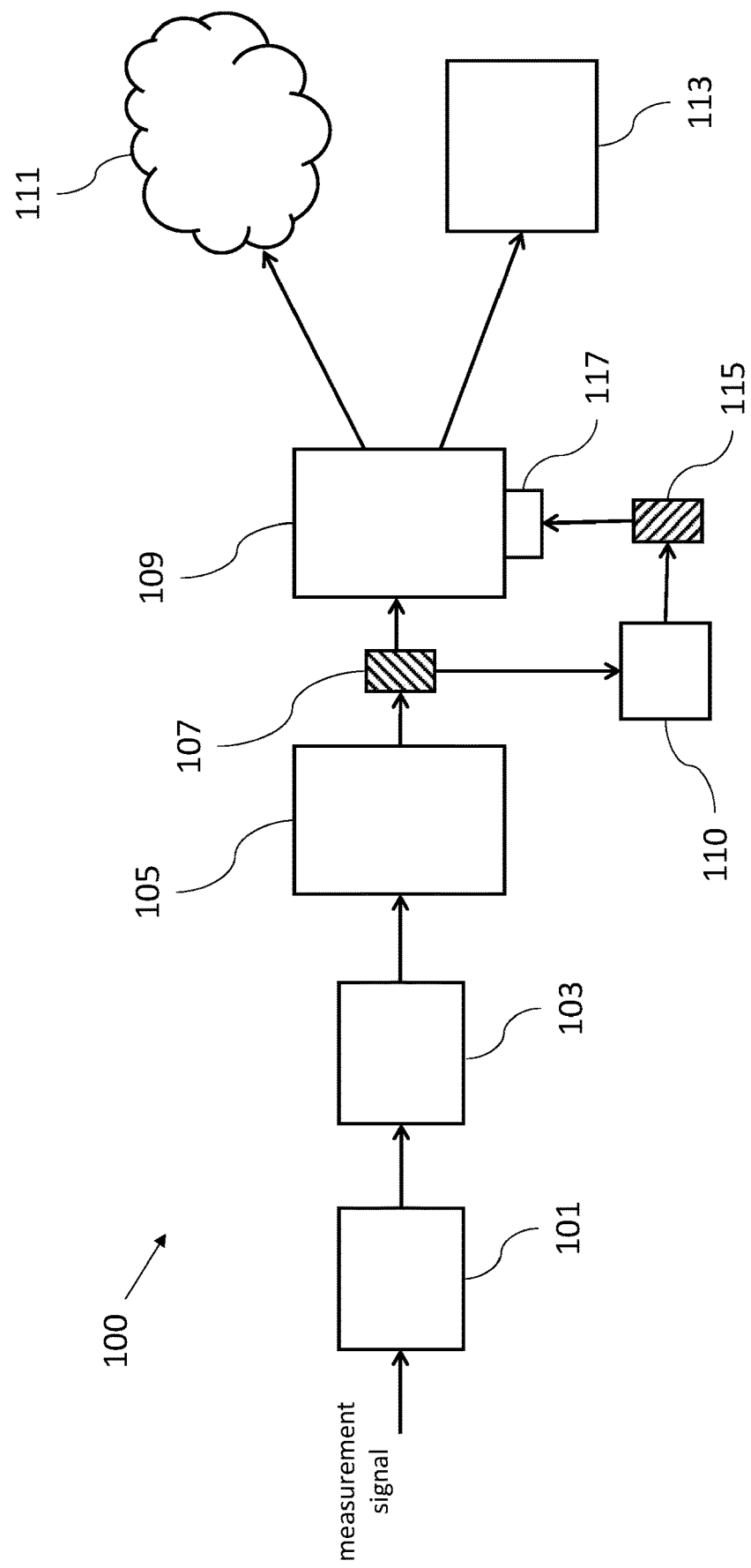
FIG. 1 shows a schematic diagram of system for generating synthetic digital data according to an embodiment.

FIG. 1 shows a schematic diagram of system 100 for generating synthetic digital data according to an embodiment.

The system 100 comprises receiver 101 for receiving at least one measured signal, in particular an RF signal or a sensor signal, a converter 103 for converting the at least one measured signal to a digital dataset representing signal characteristics of the at least one measured signal, at least one trainable neural network encoder 105, wherein during a training routine the neural network encoder 105 is configured to receive the digital dataset and to generate a compressed representation 107 of the digital dataset.

The system 100 further comprises a processing unit 110 configured to analyze the compressed representation 107 and to detect a correlation between the digital dataset and the compressed representation, wherein the processing unit 110 is configured to generate decoder input data 115 based on the detected correlation, and a trained neural network decoder 109 which is configured to receive the decoder input data 115 and to generate synthetic digital data representing signal characteristics of the at least one measured signal based on the decoder input data 115.

In particular, the at least one neural network encoder 105 and the neural network decoder 109 form a variational autoencoder (VAE).

The receiver 101 and the converter 103 can form a data acquisition unit for receiving RF signals and converting them to original digital IQ data.

The neural network encoder 105 can form a data analysis unit configured to convert the original digital IQ data pattern into a digital data pattern with a certain dimension.

The neural network decoder 109 can form a data generation unit configured to reconvert data with reduced dimension into a synthetic digital IQ pattern.

Preferably, the system 100 comprises an interface 117 for forwarding the decoder input data 115 to the trained neural network decoder 109

The processing unit 110 can be configured to generate the decoder input data by superimposing random or pseudorandom data with information based on the detected The embodiment of the system 100 shown in FIG. 1 further comprises a data storage 111 and a transmitter 113. The data storage 111 and/or the transmitter 113 are both optional components of the system 100. The system 100 can also comprise only the transmitter 113 or only the data storage 111.

The data storage 111 can be configured to store the digital data and the generated synthetic digital data, or only the generated synthetic digital data. The data storage 111 can comprise a physical memory and/or a cloud storage.

The transmitter 113 can comprise a communication interface for forwarding data to a receiver device. The transmitter 113 can be configured to transmit the digital data and the generated synthetic digital data to the receiver device, or only to transmit the synthetic digital data to the receiver device.

The at least one measured signal can comprise an RF signal. For instance, the measured signal is a signal in a wireless communication network, such as a 3G, 4G or 5G network.

The at least one measured signal can comprise a sensor signal, e.g. a radar or lidar signal, that was measured with a sensor. The signal can comprise position or time information. The signal can further comprise an RF channel measurement signal, which, for instance, was measured with a channel sounder.

In particular, the signal is a test signal that is generated by a test measurement. For instance, the signal is an RF test signal generated during a field test of a device, e.g. a vehicle equipped with sensors.

The processing unit 110 can be configured to generate the decoder input data 115 by superimposing random or pseudorandom data with information based on the detected correlation. The Information on the detected correlation can be expressed as constraints on the random or pseudorandom data.

In other words: the decoder input data 115 is generated by applying constraints to the random or pseudorandom data based on the detected correlation. The constraints can reflect the detected correlation.

Preferably, the system 100 comprises a plurality of trainable neural network encoders 105. The digital dataset can comprise at least two data segments, wherein, during the training routine, each neural network encoder 105 is configured to receive a data segment of the digital dataset and to generate a compressed representation 107 of the respective data segment.

The processing unit 110 can be configured to analyze the compressed representations 107 of each data segment and to detect a correlation between each data segment and the corresponding compressed representation 107. In particular, the processing unit is configured to analyze the compressed representations 107 by comparing them with each other.

The processing unit 110 can be configured to generate the decoder input data 115 based on the detected correlations for each data segment.

Preferably, the system 100 allows to generate synthetic data that resembles signal characteristics of multiple sources, in particular interdependent sources. In this way, the system 100 can be used to generate synthetic data for sensor fusion. The sources can be sensors used for autonomous driving, such as cameras, radar, lidar, ultrasound, wireless sensors. The synthetic data can resemble data from real world measurements, in particular data generated via sensor fusion. In this way, the system allows adapting an arbitrary number of sources in a dedicated manner for generating the synthetic data.

In particular, the system 100 can also be used to analyze the digital datasets, e.g. for classification, validation, detection or correction of the digital datasets.

A measurement device can comprise the system 100 for generating synthetic data. In particular, the measurement device can use the system 100 to generate synthetic test data based on measurement signals recorded with the device.

Figure 2B:
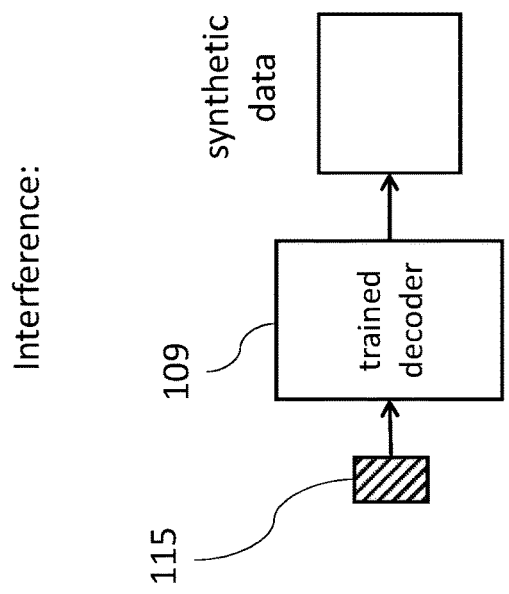
FIG. 2b shows the generation of synthetic digital data by a trained neural network decoder according to an embodiment.
Figure 2A:
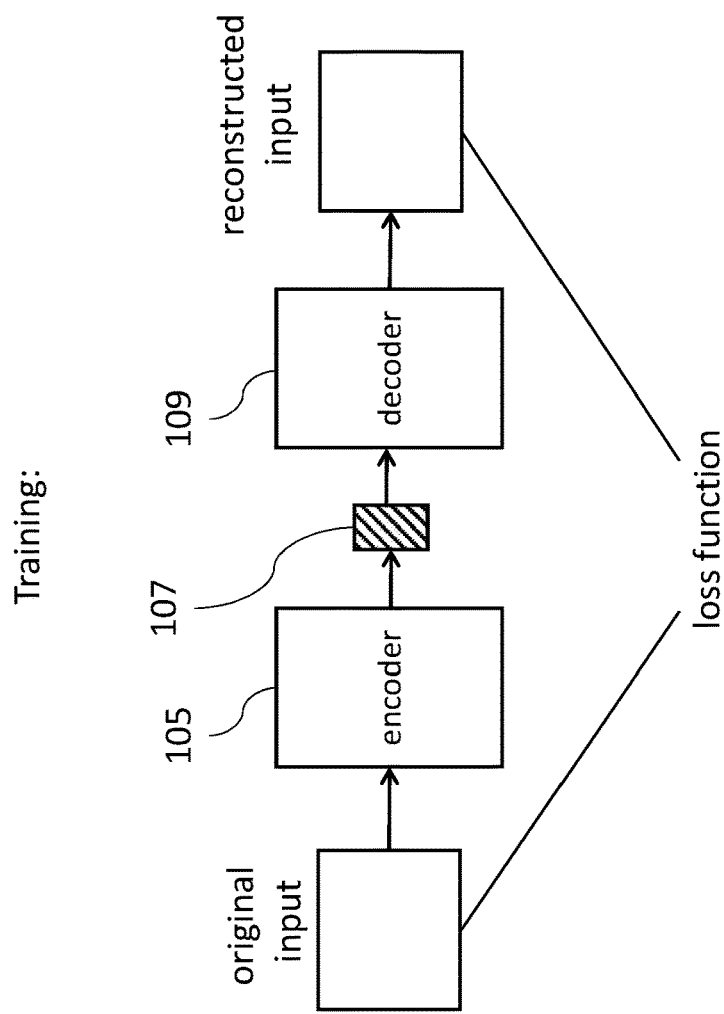
FIG. 2a shows a training routine for the at least one neural network encoder and the neural network decoder according to an embodiment.

FIG. 2a shows a training routine for the at least one neural network encoder 105 and the neural network decoder 109 according to an embodiment.

If the system 100 comprises a plurality of neural network encoders 105, each neural network encoder 105 can be trained with the same routine.

During the training a digital dataset is fed to the encoder 105, which generates the compressed representation 107 of the digital data.

The compressed representation 107 of the digital dataset can comprise a digital data pattern with a certain dimension, in particular with a lower dimension than the digital data. In particular, the compressed representation 107 of the digital data comprises latent variable data.

The compressed representation is then fed to the neural network decoder 109 which is configured to generate a reconstruction of the digital data.

Subsequently, the input dataset can be compared to the reconstructed dataset, and a loss function is determined, the loss function representing an loss between the data and the corresponding reconstructed data. In particular, the loss function represents a difference between the original dataset and the reconstructed dataset.

The processing unit 110 can be configured to compare the datasets and determine the loss function.

Subsequently, the neural network decoder 109 and/or the neural network encoder 105 can be configured to adapt the structure of their respective neural network based on the loss function, in particular to decrease the loss function.

The training routine shown in FIG. 2a can be repeated with a variety of datasets.

FIG. 2b shows the generation of synthetic digital data by a trained neural network decoder 109 according to an embodiment.

For the generation of the synthetic data, the neural network decoder 109 is fed with the decoder input data 115 that was generated by the processing unit 110. On the basis of this data 115 and the previous training, the neural network decoder 109 is configured to generate a synthetic digital dataset that resembles the original training data.

Figure 3:
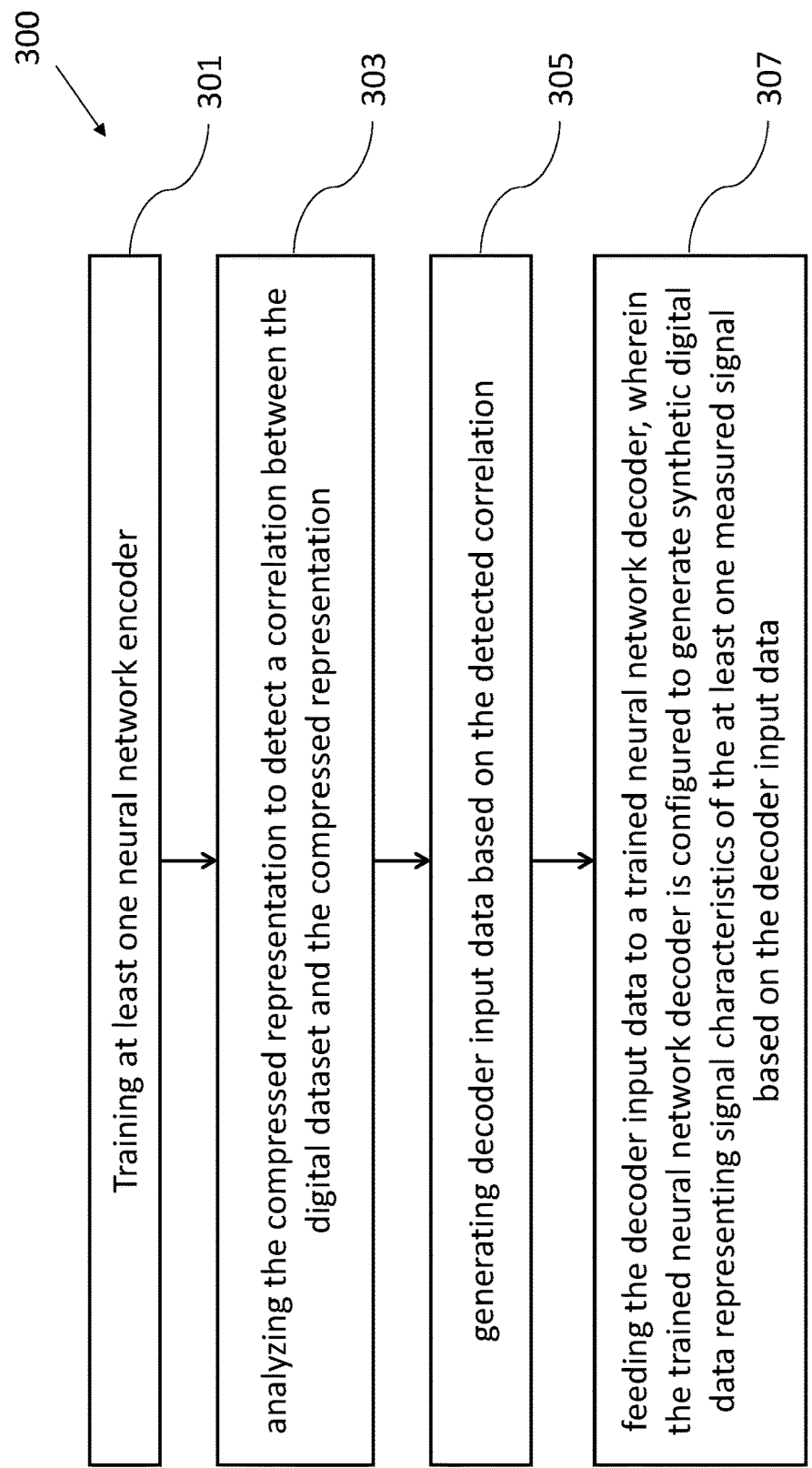
FIG. 3 shows a schematic diagram of a method for generating synthetic digital data according to an embodiment.

FIG. 3 shows a schematic diagram of a method 300 for generating synthetic digital data according to an embodiment.

The method 300 comprises the steps of: training 301 at least one neural network encoder, wherein during the training a digital dataset is fed to the at least one neural network encoder 105, wherein the neural network encoder 105 is configured to generate the compressed representation 107 of the digital dataset, analyzing 303 the compressed representation 107 to detect a correlation between the digital dataset and the compressed representation 107, generating 305 decoder input data based on the detected correlation, and feeding 307 the decoder input data to the trained neural network decoder 109, wherein the trained neural network decoder 109 is configured to generate synthetic digital data representing signal characteristics of the at least one measured signal based on the decoder input data 115.

The method 300 can be carried out by the system 100 shown in FIG. 1, in particular after training the neural network encoder and decoder 109.

Figure 4:
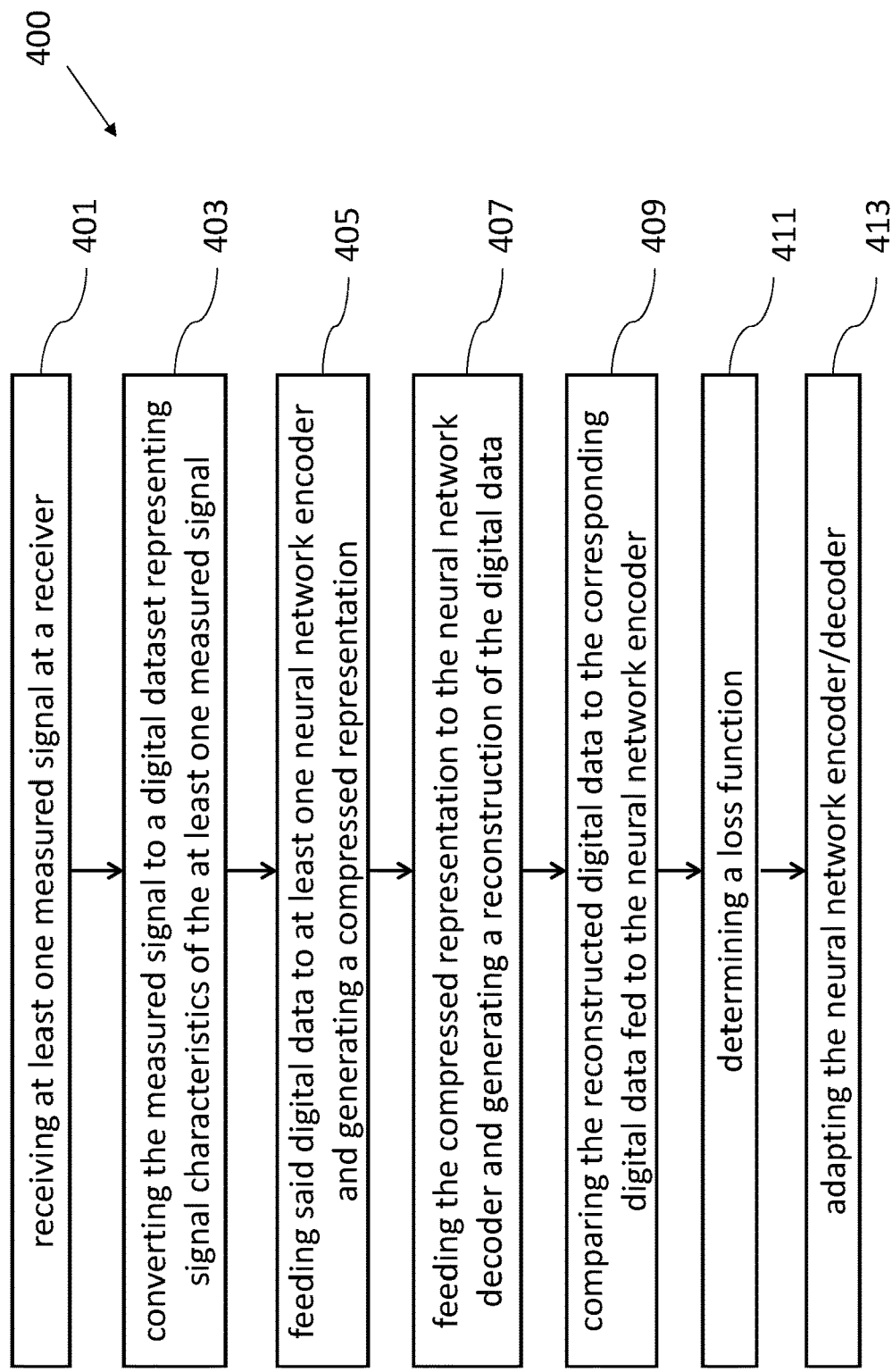
FIG. 4 shows a schematic diagram of a method for training at least one neural network encoder according to an embodiment.

FIG. 4 shows a schematic diagram of a method 400 for training the at least one neural network encoder 105 according to an embodiment.

The method 400 shown in FIG. 4 can correspond to the step of training 301 the at least one neural network encoder 105 as shown in FIG. 3.

The method 400 shown in FIG. 4 is also a method for training the neural network decoder 109. In particular, the method 400 corresponds to the training routine for the neural network encoder 105 respectively decoder 109. The two terms training and training routine can be used equivalently.

The method 400 comprises the steps of: receiving 401 at least one measured signal, in particular an RF signal or a sensor signal, converting 403 the at least one measured signal to digital data representing signal characteristics of the at least one measured signal, feeding 405 said digital data to the at least one neural network encoder 105, and generating the compressed representation 107 of the digital data via the neural network encoder 105.

Preferably, the method 400 comprises the further steps of: feeding 407 the compressed representation of the digital data to the neural network decoder 109, wherein the neural network decoder 109 is configured to generate a reconstruction of the digital data based on the compressed representation, comparing 409 the reconstructed digital data generated by the neural network decoder 109 to the corresponding digital dataset fed to the neural network encoder 105, and determining 411 a loss function, representing a loss between the digital dataset and the corresponding reconstructed digital data, and adapting 413 the neural network encoder 105 and/or the neural network decoder 109 based on the loss function.

The decoder input data 115 can be generated by superimposing random or pseudorandom data with information based on the detected correlation, wherein the information on the detected correlation represents constraints on the random or pseudorandom data.

The digital dataset can comprise at least two data segments, wherein a plurality of neural network encoders are trained according to the method 400 shown in FIG. 4. During the training routine, each neural network encoder 105 is configured to receive a data segment of the digital dataset and to generate a compressed representation 107 of the respective data segment.

Preferably, a system 100 with a plurality of neural network encoders 105 comprises a plurality of neural network decoders 109, wherein each one encoder 105 and forms a pair with one decoder 109 and they are trained together.

The step of detecting 303 a correlation between the digital dataset and the compressed representation as shown in FIG. 3 can comprise detecting a correlation between each of the at least two data segments and the corresponding compressed representation. In particular, the correlation is detected by comparing the compressed representations with each other.

The step of generating 305 the decoder input data as shown in FIG. 3 can comprise: generating the decoder input data based on the detected correlations for the at least two data segments.

Figure 5:
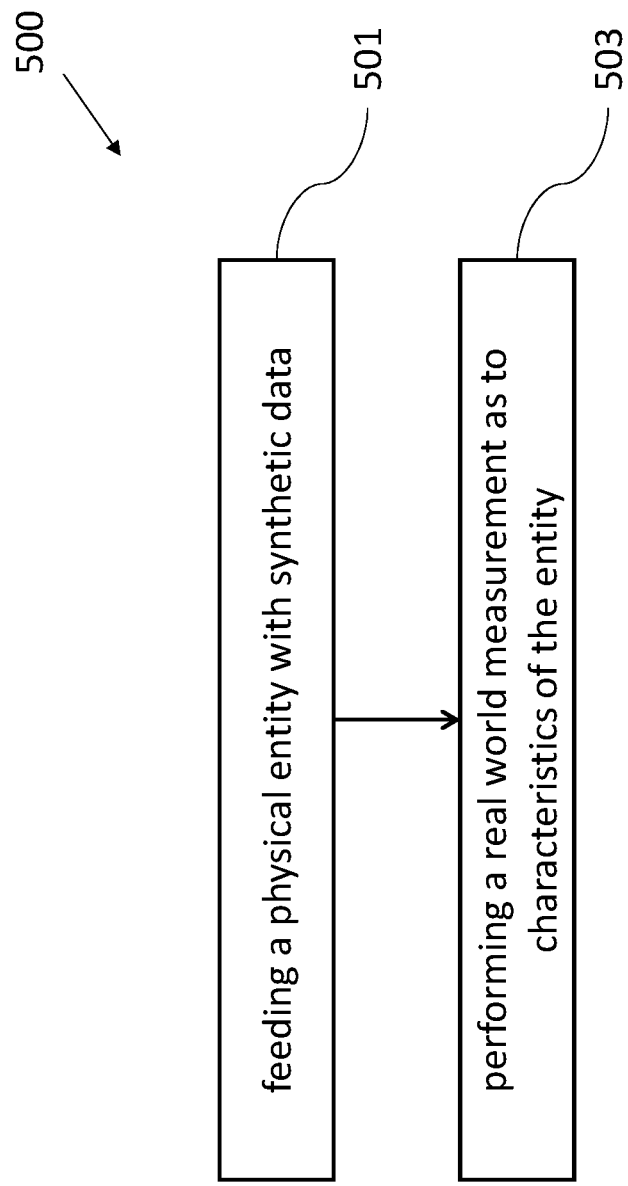
FIG. 5 shows a schematic diagram of a test method for a physical entity according to an embodiment.

FIG. 5 shows a schematic diagram of a test method 500 for a physical entity according to an embodiment.

The method test 500 comprises the steps of feeding 501 the entity with the synthetic digital data, and performing 503 a real world measurement as to characteristics of the entity.

In particular, the synthetic data is generated according to the method 300 shown in FIG. 3.

The physical entity can be a communication channel. The test method 500 can be used to test physical properties of the communication channel using synthetic data. This provides the advantage that the channel can be tested with a large dataset.

Furthermore, the test method 500 allows simulating and testing non-standard communication channels, for which only a small amount of measured data exists. Examples for non-standard channels are communication channels that are modulated by rotor movements of a helicopter or 5G networks used e.g. for industry automation.

A user, for instance, collects measured signals of such a non-standard channel using a channel sounder. The user can then generate further synthetic data based on the measured signals using the method 300 shown in FIG. 3 and subsequently use the synthetic data for testing the channel using the test method 500 shown in FIG. 5.

The physical entity can comprise various sensors and communication devices. For instance, the physical entity is a car, in particular a self-driving car.

Figure 6:
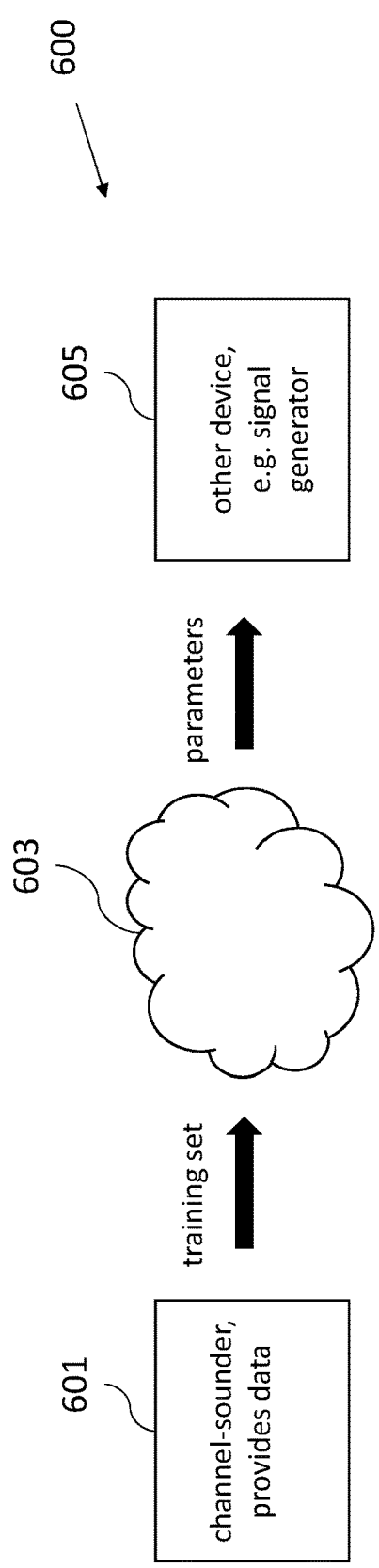
FIG. 6 shows a schematic diagram of an architecture for testing a non-standard communication channel according to an embodiment.

FIG. 6 shows a schematic diagram of an architecture 600 for testing a non-standard communication channel according to an embodiment.

The architecture 600 comprises a measurement device 601, such as a channel sounder, for collecting data of the non-standard communication channel. The data is forwarded to a system 603 for generated synthetic data, for instance the system 100 as shown in FIG. 1. In particular, the collected data is used to train the system 603. The system 603 generates synthetic data that can be forwarded to another device 605, e.g. a signal generator.

Figure 7:
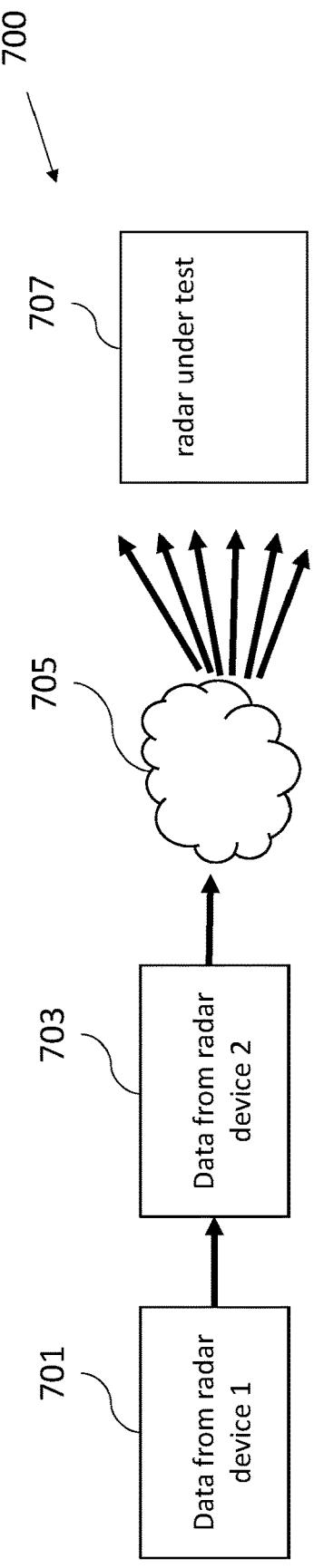
FIG. 7 shows a schematic diagram of an architecture for generating a large number of test cases from a limited number of training cases according to an embodiment.

FIG. 7 shows a schematic diagram of an architecture 700 for generating a large number of test cases from a limited number of training cases according to an embodiment.

The architecture 700 comprises at least one device 701, 703, for instance two radar devices, which generates a limited parameter set of measurements, e.g. 5-10 sets. These measurements can be interdependent. The parameter sets are forwarded to a system 705 for generating synthetic data, for instance the system 100 as shown in FIG. 1. In particular, the parameter sets are used to train a neural network decoder.

The synthetic data generated by the system 705 can then be forwarded to another device 707, e.g. a radar under test for providing a test routine. The amount of synthetic data generated by the system 705 is not limited by the number of parameter sets provided by the devices 701, 703 and can be much larger than the number of parameter sets.

A further possible application of the architectures 600, 700 in FIG. 6 or 7 is a fading simulator for a signal generator. The system 603, 705 can generate a large number of artificial ARB files or channels from a few original files which were generated by a channel sounder. Preferably, the artificial ARB files are very similar to the ARB files generated by the channel sounder. Another advantage would be that the artificial data can be generated in real time by inference and therefore does not have to be stored in the signal generator.

The fading simulator can also be used for signal testing of a communication device. During these signal tests, data is sent to or received from the device, to either establish a successful communication connection with the device according to a communication standard or to measure the throughput. For analyzing a transmission path, communication channels are often simulated. In this context, artificial channel data could be generated by the system 603, 705 and subsequently used in a test environment that is close to reality.

The systems 603, 705 can also be used to generate data for mobile network testing. For instance, IQ-data that was recorded during drive-tests can be multiplied and stored in a cloud. Furthermore, the systems 603, 705 can be used to generate synthetic data for environmental simulations with automotive radars from a limited set of parameters recorded by a radar in a real world measurement.

Furthermore, the systems 603, 705 can be used to generate synthetic data for channel testing to improve the performance of communication technology modems. Generally, these tests are either performed by using synthesized channel models which were generated on the basis of common channel modules, or by using realistic channel models which are based on real world measurements by a channel sounder. The latter are however only available in limited numbers. The systems 603, 705 can be used to multiply the channel sounder measurements in order to generate synthetic channel models that resembles channel modules based on real world measurements.

Figure 8:
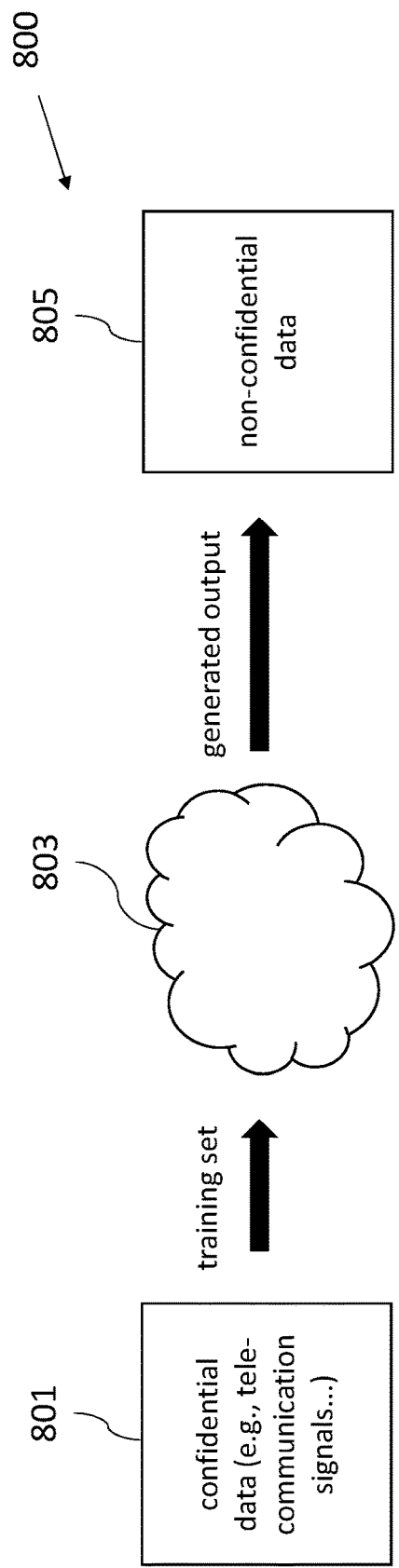
FIG. 8 shows a schematic diagram of an architecture for providing non-confidential synthetic data according to an embodiment.

FIG. 8 shows a schematic diagram of an architecture 800 for providing non-confidential synthetic data according to an embodiment.

The architecture 800 comprises a confidential data source 801 that, for instance, provides confidential telecommunication data to a system 803 for generating synthetic data, for instance the system 100 as shown in FIG. 1.

The trained system 803 can then generates synthetic non-confidential data 805 that can be used for the training of another telecommunication device.

The systems 603, 705, 803 for generating synthetic digital data in FIGS. 6, 7 and 8 can be implemented as cloud computing systems.

All features of all embodiments described, shown and/or claimed herein can be combined with each other.

The invention claimed is:

1. A system for generating synthetic digital data, comprising:
   a receiver configured to receive at least one measured signal, in particular an RF signal or a sensor signal,
   a converter configured to convert the at least one measured signal to a digital dataset representing signal characteristics of the at least one measured signal,
   at least one trainable neural network encoder, wherein during a training routine the neural network encoder is configured to receive the digital dataset and to generate a compressed representation of the digital dataset,
   a processing unit configured to analyze the compressed representation and to detect a correlation between the digital dataset and the compressed representation,
   wherein the processing unit is configured to generate decoder input data based on the detected correlation, and
   a trained neural network decoder which is configured to receive the decoder input data and to generate synthetic digital data representing signal characteristics of the at least one measured signal based on the decoder input data.

2. The system of claim 1, wherein the processing unit is configured to generate the decoder input data by superimposing random or pseudorandom data with information based on the detected correlation, wherein the information based on the detected correlation represents constraints on the random or pseudorandom data.

3. The system of claim 1, wherein the digital dataset comprises at least two data segments, wherein the system comprises a plurality of trainable neural network encoders, wherein, during the training routine, each neural network encoder is configured to receive a data segment of the digital dataset and to generate a compressed representation of the respective data segment.

4. The system of claim 3, wherein the processing unit is configured to analyze the compressed representations of each data segment and to detect a correlation between each data segment and the corresponding compressed representation, in particular by comparing the compressed representations with each other.

5. The system of claim 4, wherein the processing unit is configured to generate the decoder input data based on the detected correlations for each data segment.

6. A method for generating synthetic digital data, comprising the steps of:
training at least one neural network encoder, by:
a) receiving at least one measured signal, in particular an RF signal or a sensor signal,
b) converting the at least one measured signal to a digital dataset representing signal characteristics of the at least one measured signal, and
c) feeding said digital dataset to the at least one neural network encoder, wherein the neural network encoder is configured to generate a compressed representation of the digital dataset,
analyzing the compressed representation to detect a correlation between the digital dataset and the compressed representation,
generating decoder input data based on the detected correlation,
feeding the decoder input data to a trained neural network decoder, wherein the trained neural network decoder is configured to generate synthetic digital data representing signal characteristics of the at least one measured signal based on the decoder input data.

7. The method of claim 6, wherein the decoder input data is generated by superimposing random or pseudorandom data with information based on the detected correlation, wherein the information based on the detected correlation represents constraints on the random or pseudorandom data.

8. The method of claim 6, wherein the digital dataset comprises at least two data segments, wherein a plurality of neural network encoders are trained, wherein during the training routine each neural network encoder is configured to receive a data segment of the digital dataset and to generate a compressed representation of the respective data segment.

9. The method of claim 8, wherein the step of detecting a correlation between the digital dataset and the compressed representation comprises detecting a correlation between each data segment and the corresponding compressed representation, in particular by comparing the compressed representations with each other.

10. The method of claim 9, wherein the decoder input data is generated based on the detected correlations for the at least two data segments.

11. The method of claim 7, wherein the at least one neural network encoder and the neural network decoder are further trained by:
feeding the compressed representation of the digital dataset to the neural network decoder, wherein the neural network decoder is configured to generate a reconstruction of the digital dataset based on the compressed representation,
comparing the reconstructed digital dataset generated by the neural network decoder to the corresponding digital dataset fed to the neural network encoder,
determining a loss function, representing an accuracy loss between the digital dataset and the corresponding reconstructed digital dataset, and
adapting the neural network encoder and/or the neural network decoder based on the loss function.

12. A test method for a physical entity, in particular a communication channel or a measurement device, comprising feeding the entity with the synthetic data generated according to the method of claim 6, and performing a real world measurement as to characteristics of the entity.

13. A non-transitory computer storage medium comprising a plurality of computer executable instructions executable by a processor to:
train at least one neural network encoder to:
receive at least one measured signal, in particular an RF signal or a sensor signal,
convert the at least one measured signal to a digital dataset representing signal characteristics of the at least one measured signal, and
feed said digital dataset to the at least one neural network encoder, wherein the neural network encoder is configured to generate a compressed representation of the digital dataset,
analyze the compressed representation to detect a correlation between the digital dataset and the compressed representation,
generate decoder input data based on the detected correlation, and
feed the decoder input data to a trained neural network decoder, wherein the trained neural network decoder is configured to generate synthetic digital data representing signal characteristics of the at least one measured signal based on the decoder input data.

* * * * *